US012640312B2

(12) United States Patent
Take et al.

(10) Patent No.: US 12,640,312 B2
(45) Date of Patent: May 26, 2026

(54) CERAMIC ELECTRONIC DEVICE WITH INTERMITTANTLY PROVIDED CONDUCTIVE THIN FILM AND MANUFACTURING METHOD OF THE SAME

(71) Applicant: TAIYO YUDEN CO., LTD., Tokyo (JP)

(72) Inventors: Yoshinari Take, Tokyo (JP); Junko Sakashita, Tokyo (JP); Kenichi Shimomai, Tokyo (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 156 days.

(21) Appl. No.: 18/159,561

(22) Filed: Jan. 25, 2023

(65) Prior Publication Data

US 2023/0245832 A1 Aug. 3, 2023

(30) Foreign Application Priority Data

Feb. 3, 2022 (JP) ................................. 2022-015619

(51) Int. Cl.
H01G 4/30 (2006.01)
H01G 4/008 (2006.01)
(Continued)

(52) U.S. Cl.
CPC .............. *H01G 4/30* (2013.01); *H01G 4/008* (2013.01); *H01G 4/012* (2013.01); *H01G 4/12* (2013.01); *H01G 4/232* (2013.01)

(58) Field of Classification Search
CPC .......... H01G 4/30; H01G 4/008; H01G 4/012; H01G 4/12; H01G 4/232; H01G 4/1227; H01G 4/2325; H01G 4/005
See application file for complete search history.

(56) References Cited

U.S. PATENT DOCUMENTS

2006/0145401 A1* 7/2006 Mihara ................... H01G 4/232
264/618
2007/0074806 A1* 4/2007 Kojima ................. C04B 35/638
156/89.12
(Continued)

FOREIGN PATENT DOCUMENTS

JP 2012-164966 A 8/2012
JP 2020-161734 A 10/2020
(Continued)

OTHER PUBLICATIONS

Japanese Office Action dated Dec. 9, 2025 in a counterpart Japanese patent application No. 2022-015619. (A machine translation (not reviewed for accuracy) attached.).

*Primary Examiner* — Timothy J. Dole
*Assistant Examiner* — Daniel M Dubuisson
(74) *Attorney, Agent, or Firm* — CHEN YOSHIMURA LLP

(57) ABSTRACT

A ceramic electronic device includes a multilayer chip in which each of a plurality of dielectric layers and each of a plurality of internal electrode layers are alternately stacked, the multilayer chip having a parallelepiped rectangular shape, the plurality of internal electrode layers being alternately exposed to two opposite faces of the multilayer chip, and two external electrodes that are formed respectively on the two opposite faces. The two external electrodes have a structure in which a plated layer is formed on a conductive thin film intermittently formed with a thickness of 0.1 µm or more and 1.5 µm or less.

12 Claims, 12 Drawing Sheets

(51) Int. Cl.

| | | |
|---|---|---|
| *H01G 4/012* | (2006.01) | |
| *H01G 4/12* | (2006.01) | |
| *H01G 4/232* | (2006.01) | |

(56) References Cited

U.S. PATENT DOCUMENTS

| | | | |
|---|---|---|---|
| 2007/0109718 A1* | 5/2007 | Horie ..................... | H01G 4/30 |
| | | | 361/306.3 |
| 2008/0123248 A1* | 5/2008 | Kunishi ................... | C25D 5/02 |
| | | | 361/306.3 |
| 2009/0303655 A1* | 12/2009 | Ogawa .................... | H01G 4/30 |
| | | | 29/25.42 |
| 2010/0091426 A1* | 4/2010 | Motoki ................... | H01C 7/18 |
| | | | 29/25.42 |
| 2012/0188682 A1 | 7/2012 | Sato et al. | |
| 2013/0063862 A1* | 3/2013 | Kim ....................... | H01G 4/30 |
| | | | 156/182 |
| 2015/0136463 A1* | 5/2015 | Lee ....................... | H01G 4/232 |
| | | | 361/301.4 |

| | | | |
|---|---|---|---|
| 2016/0099111 A1* | 4/2016 | Ito ........................... | H01G 4/12 |
| | | | 361/301.4 |
| 2016/0133398 A1* | 5/2016 | Nishisaka ............. | H01G 4/306 |
| | | | 427/79 |
| 2016/0217930 A1* | 7/2016 | Yamaguchi .......... | H01G 4/0085 |
| 2018/0061574 A1* | 3/2018 | Kitamura .............. | H01G 4/258 |
| 2018/0174753 A1* | 6/2018 | Terashita .............. | H01G 4/008 |
| 2020/0135403 A1* | 4/2020 | Lee .......................... | H01G 4/12 |
| 2020/0312562 A1* | 10/2020 | Nishibayashi ....... | H01G 4/2325 |
| 2021/0183576 A1* | 6/2021 | Song ..................... | H01G 4/232 |
| 2022/0115184 A1* | 4/2022 | Yun ....................... | H01G 4/2325 |
| 2022/0122777 A1* | 4/2022 | Kang ..................... | H01G 4/30 |
| 2022/0208473 A1* | 6/2022 | Yun ....................... | H01G 4/232 |
| 2023/0162918 A1* | 5/2023 | Lee ....................... | H01G 4/1272 |
| | | | 361/301.1 |
| 2025/0054701 A1* | 2/2025 | Sato ..................... | H01G 4/1227 |

FOREIGN PATENT DOCUMENTS

| | | |
|---|---|---|
| JP | 2021-190546 A | 12/2021 |
| WO | 2007/148484 A1 | 12/2007 |

* cited by examiner

CERAMIC ELECTRONIC DEVICE WITH INTERMITTANTLY PROVIDED CONDUCTIVE THIN FILM AND MANUFACTURING METHOD OF THE SAME

FIELD

A certain aspect of the present disclosure relates to a ceramic electronic device and a manufacturing method of the ceramic electronic device.

BACKGROUND

A wide variety of ceramic electronic devices are used in high-frequency communication systems such as mobile phones. As one form thereof, a multilayer ceramic capacitor has been proposed (see, for example, Patent Document 1).

PRIOR ART

Patent Document

Document 1: International Publication No. 2007-148484

SUMMARY OF THE INVENTION

In Patent Document 1, a foil-like metal film of 0.1 to 1.0 μm is provided on both ends of a stack body before firing in which dielectric layers and internal electrode layers are stacked, and the stack body is fired. Internal electrodes are alternately exposed at both ends of the stack body, and the metal foils function as external electrodes of the capacitor. By forming the metal foil around the sides and both the top and bottom and using it as a seed layer for plating, the external electrodes become thinner than when the seed layer is formed by applying paste, which contributes to the miniaturization and thinning of the device. However, if the metal foil is continuous even after firing, the plated layer and the metal foil are likely to separate, and there is a risk that the adhesion strength to the substrate will decrease.

The present invention has been made in view of the above problems, and an object of the present invention is to provide a ceramic electronic device capable of suppressing peeling of the plated layer on the external electrode, and a method of manufacturing the same.

According to a first aspect of the embodiments, there is provided a ceramic electronic device including: a multilayer chip in which each of a plurality of dielectric layers and each of a plurality of internal electrode layers are alternately stacked, the multilayer chip having a parallelepiped rectangular shape, the plurality of internal electrode layers being alternately exposed to two opposite faces of the multilayer chip; and two external electrodes that are formed respectively on the two opposite faces, wherein the two external electrodes have a structure in which a plated layer is formed on a conductive thin film intermittently formed with a thickness of 0.1 μm or more and 1.5 μm or less.

A continuity modulus of the conductive thin film may be 30% or more and 90% or less.

In at least a part of the conductive thin film, each of holes with a width of 0.1 μm or more and 10.0 μm or less for exposing the multilayer chip and each of island-shaped portions with a height of 0.1 μm or more and 1.5 μm or less may be alternately formed.

In at least a part of the conductive thin film, a discontinuous island-shaped portion may be formed.

In a cross section of the plurality of internal electrode layers and the plurality of dielectric layers in a stacking direction, in a region where the plurality of internal electrode layers are exposed, the conductive thin film may include an island-shaped portion connected to at least one of the plurality of internal electrode layers and an island-shaped portion not connected to any of the plurality of internal electrode layers.

The conductive thin film may be continuous in a region where the plurality of internal electrode layers are exposed on the two end faces.

The external electrodes may not necessarily formed on one of an upper face and a lower face of the multilayer chip in a stacking direction of the plurality of internal electrode layers and the plurality of dielectric layers.

A thickness of the plated layer may be 1 μm or more and 15 μm or less. The plated layer may have a structure in which a Cu-plated layer, a Ni-plated layer and a Sn-plated layer are formed in this order from the conductive thin film. The plated layer may be thicker than the conductive thin film. The ceramic electronic device may be a multilayer ceramic capacitor.

According to a first aspect of the embodiments, there is provided a manufacturing method of a ceramic electronic device including: forming a ceramic multilayer structure in which each of a plurality of dielectric green sheets and each of a plurality of metal conductive pastes are alternately stacked, the ceramic electronic device having a parallelepiped rectangular shape, the plurality of metal conductive pastes being alternately exposed to two opposite faces of the ceramic multilayer structure; and forming a conductive thin film on each of the two opposite faces by a vacuum film formation method, wherein the ceramic multilayer structure and the conductive thin film are formed together with each other by firing so that the conductive thin film becomes an intermittent film having a thickness of 0.1 μm or more and 1.5 μm or less, and wherein a plated layer is formed on the intermittent film. The conductive thin film may be formed, by sputtering, on the two opposite faces after removing a binder from the ceramic multilayer structure. The conductive thin film may be formed by using a Ni-based target. The ceramic electronic device may be a multilayer ceramic capacitor.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

DETAILED DESCRIPTION

Hereinafter, an exemplary embodiment will be described with reference to the accompanying drawings.

First Embodiment

Figure 1:
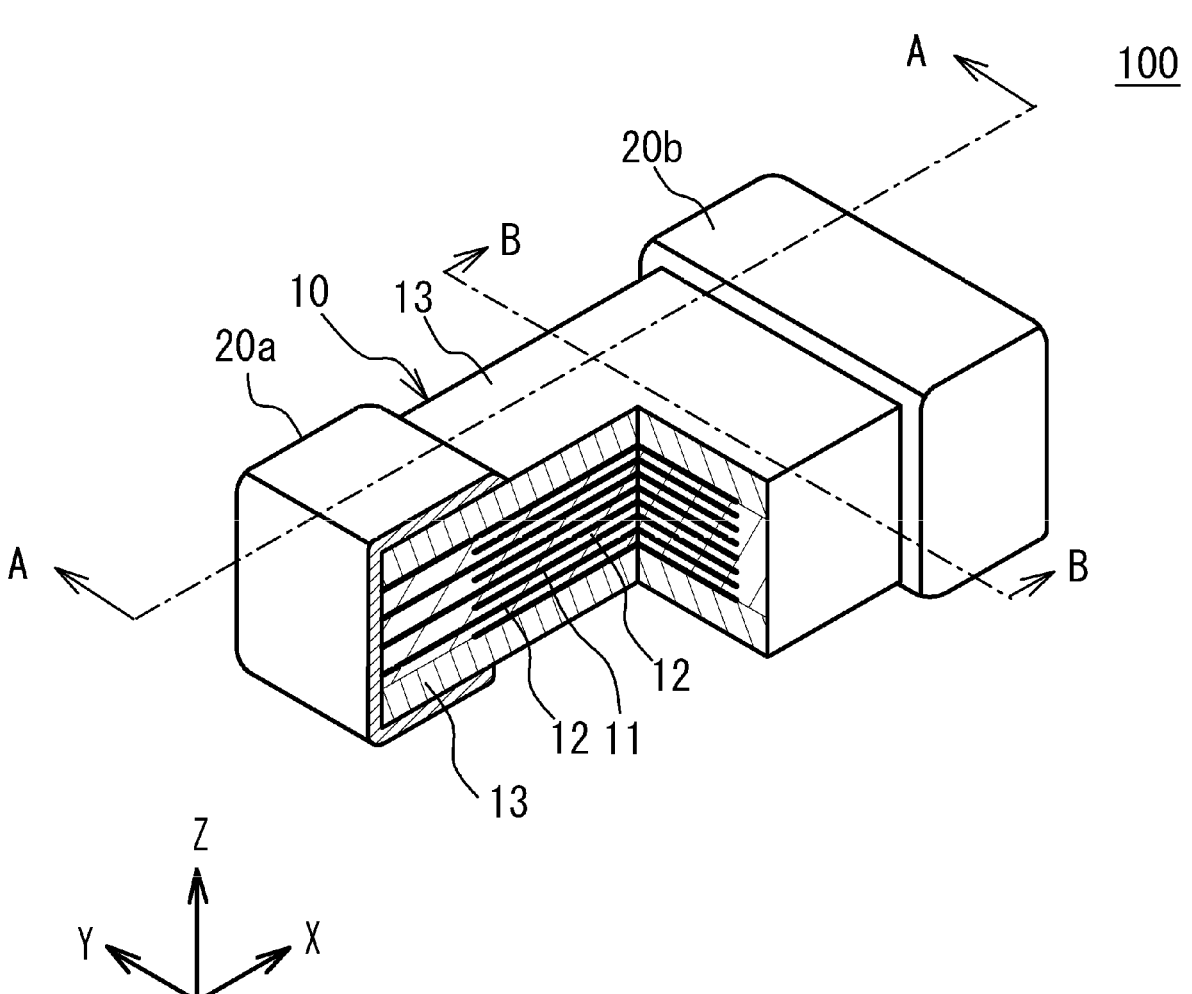
FIG. 1 is a partial cross-sectional perspective view of a multilayer ceramic capacitor.
Figure 2:
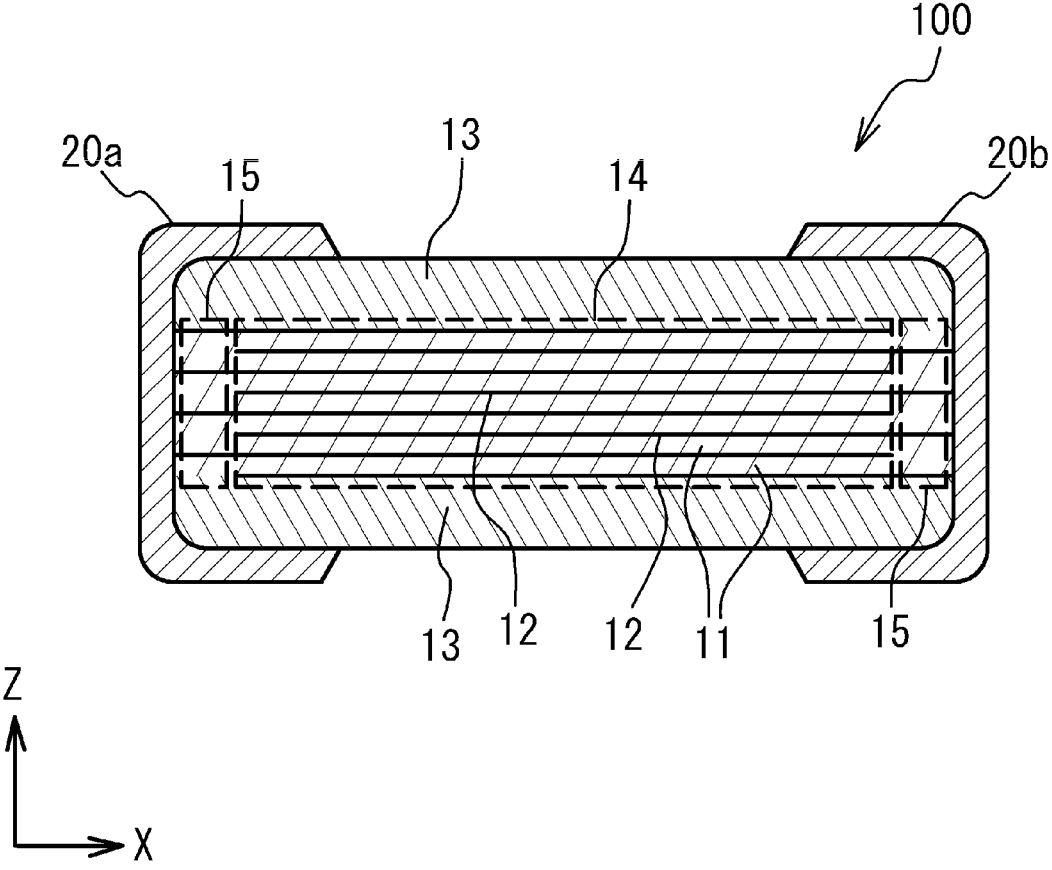
FIG. 2 is a cross-sectional view taken along line A-A in FIG. 1.
Figure 3:
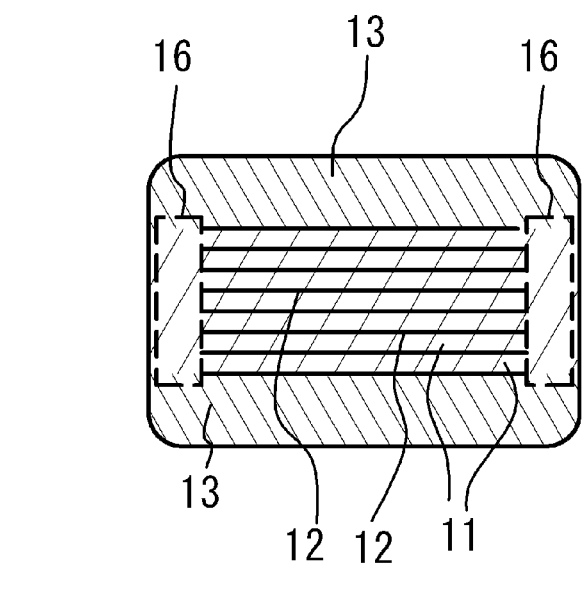
FIG. 3 is a cross-sectional view taken along line B-B in FIG. 1.
Figure 3:
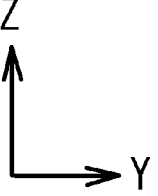

FIG. 1 illustrates a perspective view of a multilayer ceramic capacitor 100 in accordance with an embodiment, in which a cross section of a part of the multilayer ceramic capacitor 100 is illustrated. FIG. 2 is a cross-sectional view taken along line A-A in FIG. 1. FIG. 3 is a cross-sectional view taken along line B-B in FIG. 1. As illustrated in FIG. 1 to FIG. 3, the multilayer ceramic capacitor 100 includes a multilayer chip 10 having a rectangular parallelepiped shape, and external electrodes 20a and 20b that are respectively provided on two end faces of the multilayer chip 10 opposite to each other. Among four faces other than the two end faces of the multilayer chip 10, two faces other than the top face and the bottom face in the stack direction are referred to as side faces. Each of the external electrodes 20a and 20b extends to the top face and the bottom face in the stack direction and the two side faces of the multilayer chip 10. However, the external electrodes 20a and 20b are spaced from each other.

In FIG. 1 to FIG. 3, an X-axis direction is a longitudinal direction of the multilayer chip 10. The X-axis direction is a direction in which the two end faces of the multilayer chip 10 are opposite to each other and in which the external electrode 20a is opposite to the external electrode 20b. AY-axis direction is a width direction of the internal electrode layers. The Y-axis direction is a direction in which two side faces of the multilayer chip 10 are opposite to each other. A Z-axis direction is a stacking direction. The Z-axis direction is a direction in which the upper face of the multilayer chip 10 is opposite to the lower face of the multilayer chip 10. The X-axis direction, the Y-axis direction and the Z-axis direction are vertical to each other.

The multilayer chip 10 has a structure designed to have dielectric layers 11 and internal electrode layers 12 alternately stacked. The dielectric layer 11 contains a ceramic material acting as a dielectric material. The internal electrode layer 12 contains a base metal. End edges of the internal electrode layers 12 are alternately exposed to a first end face of the multilayer chip 10 and a second end face of the multilayer chip 10 that is different from the first end face. The external electrode 20a is provided on the first end face. The external electrode 20b is provided on the second end face. Thus, the internal electrode layers 12 are alternately electrically connected to the external electrode 20a and the external electrode 20b. Accordingly, the multilayer ceramic capacitor 100 has a structure in which a plurality of the dielectric layers 11 are stacked with the internal electrode layers 12 interposed therebetween. In the multilayer structure of the dielectric layers 11 and the internal electrode layers 12, the outermost layers in the stack direction are the internal electrode layers 12, and cover layers 13 cover the top face and the bottom face of the multilayer structure. The cover layer 13 is mainly composed of a ceramic material. For example, the main component of the cover layer 13 is the same as the main component of the dielectric layer 11.

For example, the multilayer ceramic capacitor 100 may have a length of 1.0 mm, a width of 0.5 mm, and a height of 0.1 mm. The multilayer ceramic capacitor 100 may have a length of 1.0 mm, a width of 0.5 mm, and a height of 0.06 mm. The multilayer ceramic capacitor 100 may have a length of 6.0 mm, a width of 0.3 mm, and a height of 0.1 mm. However, the size of the multilayer ceramic capacitor 100 is not limited to the above sizes.

A main component of the dielectric layer 11 is a ceramic material having a perovskite structure expressed by a general formula $ABO_3$. The perovskite structure includes $ABO_{3-\alpha}$ having an off-stoichiometric composition. For example, the ceramic material is such as $BaTiO_3$ (barium titanate), $CaZrO_3$ (calcium zirconate), $CaTiO_3$ (calcium titanate), $SrTiO_3$ (strontium titanate), $MgTiO_3$ (magnesium titanate), $Ba_{1-x-y}Ca_xSr_yTi_{1-z}ZrzO_3$ ($0 \leq x \leq 1$, $0 \leq y \leq 1$, $0 \leq z \leq 1$) having a perovskite structure. $Ba_{1-x-y}Ca_xSr_yTi_{1-z}Zr_zO_3$ may be barium strontium titanate, barium calcium titanate, barium zirconate, barium titanate zirconate, calcium titanate zirconate, barium calcium titanate zirconate or the like.

Additives may be added to the dielectric layer 11. As additives to the dielectric layer 11, an oxide of magnesium (Mg), manganese (Mn), molybdenum (Mo), vanadium (V), chromium (Cr), or a rare earth element (yttrium (Y), samarium (Sm), europium (Eu), gadolinium (Gd), terbium (Tb), dysprosium (Dy), holmium (Ho), erbium (Er), thulium (Tm) and ytterbium (Yb), or an oxide of cobalt (Co), nickel (Ni), lithium (Li), boron (B), sodium (Na), potassium (K) or silicon (Si), or a glass including cobalt, nickel, lithium, boron, sodium, potassium or silicon.

The internal electrode layer 12 is mainly composed of a base metal such as nickel (Ni), copper (Cu), or tin (Sn). The internal electrode layer 12 may be composed of a noble metal such as platinum (Pt), palladium (Pd), silver (Ag), or gold (Au) or alloy including one or more of them.

As illustrated in FIG. 2, the section where the internal electrode layer 12 connected to the external electrode 20a faces the internal electrode layer 12 connected to the external electrode 20b is a section where capacity is generated in the multilayer ceramic capacitor 100. Thus, this section is referred to as a capacity section 14. That is, the capacity section 14 is a section where two adjacent internal electrode layers 12 connected to different external electrodes face each other.

The section where the internal electrode layers 12 connected to the external electrode 20a face each other with no internal electrode layer 12 connected to the external electrode 20b interposed therebetween is referred to as an end margin section 15. The section where the internal electrode layers 12 connected to the external electrode 20b face each other with no internal electrode layer 12 connected to the external electrode 20a interposed therebetween is another end margin section 15. That is, the end margin section 15 is a section where the internal electrode layers 12 connected to one of the external electrodes face each other with no internal electrode layer 12 connected to the other of the external electrodes interposed therebetween. The end margin section 15 is a section where no capacity is generated.

As illustrated in FIG. 3, in the multilayer chip 10, a section from one of the two side faces of the multilayer chip 10 to lateral side edges of the internal electrode layers 12 is referred to as a side margin section 16. That is, each of the side margin sections 16 is a section that covers the lateral side edges, extending toward one of the side faces of the multilayer structure, of the stacked internal electrode layers 12. The side margin section 16 is a section where no capacity is generated.

Figure 4:
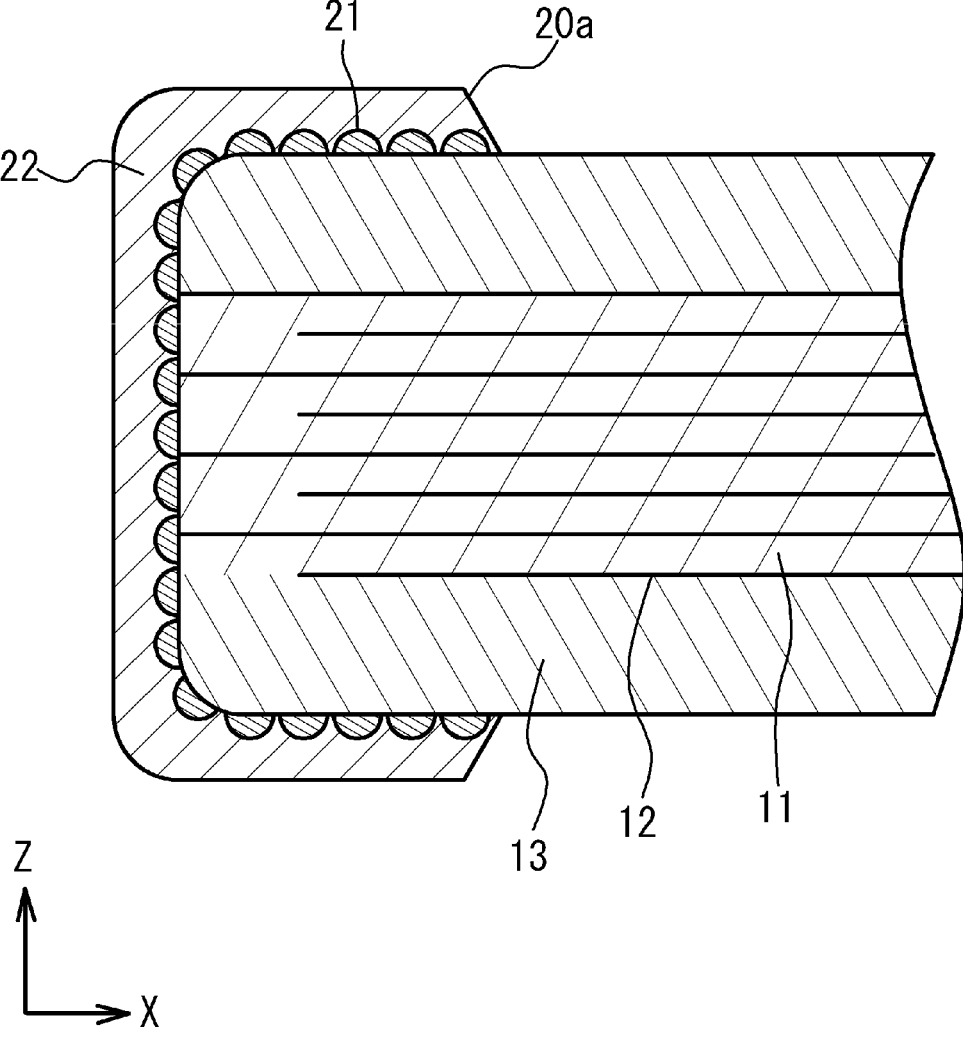
FIG. 4 illustrates a partially enlarged view of a cross-sectional view of FIG. 2.

FIG. 4 is a partially enlarged view of the cross-sectional view of FIG. 2. As illustrated in FIG. 4, the external electrodes 20a and 20b have a structure in which a plated layer 22 is formed on a conductive thin film 21. The conductive thin film 21 is a discontinuous film in which a plurality of island-like portions forming a skeleton and holes (interruptions) exposing the multilayer chip 10 are alternately arranged. A part of the plated layer 22 is in contact with the multilayer chip 10 at the hole where the conductive thin film 21 is interrupted.

The conductive thin film 21 has holes through which the multilayer chip 10 is exposed, in addition to the curved corners (edge portions) of the multilayer chip 10. In addition, in the cross section in the stacking direction, the conductive thin film 21 has an island-like portion connected to the internal electrode layer 12 in the regions where the plurality of internal electrode layers 12 are exposed on the two end surfaces of the multilayer chip 10. Alternatively, the conductive thin film 21 may have an island-like portion that is not connected to the internal electrode layer 12.

Figure 5:
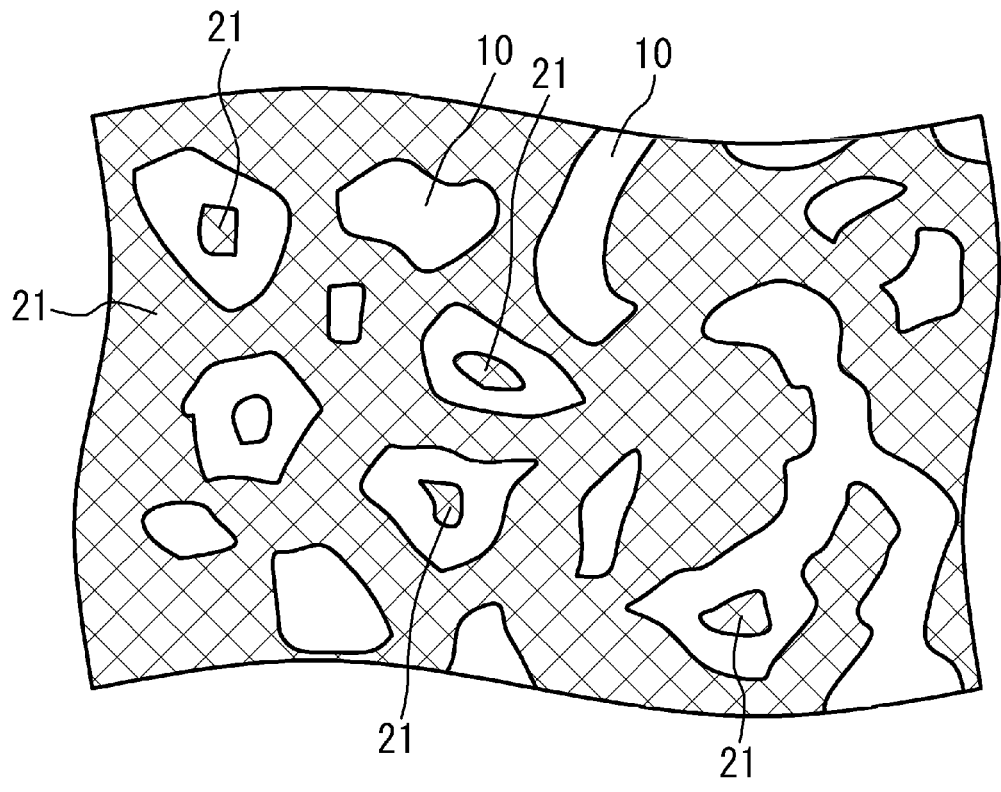
FIG. 5 is a plan view of a conductive thin film.

FIG. 5 is a plan view of the conductive thin film 21. As illustrated in FIG. 5, the conductive thin film 21 may have a mesh structure in the plan view. The multilayer chip 10 may be exposed from each mesh. In addition, the conductive thin film 21 may have discontinuous island-like portions that are completely isolated from the surrounding conductive thin film as long as the plated layer 22 can cover the multilayer chip 10.

The main component of the conductive thin film 21 is not particularly limited as long as it is a conductive metal, but examples include a metal or an alloy containing at least one of Ni, Cu, Ti, Cr, Al, Mg, Fe, Zn, Mo, Pd, Ag, Sn, Ta, W, Pt, Au, and the like. The conductive thin film 21 may have a single layer structure, or may have a laminated structure consisting of a plurality of layers. Further, the conductive thin film 21 may have a mixed film structure including a metal oxide film, a carbonized film, etc., as long as the conductive thin film 21 can maintain conductivity as a whole.

In this embodiment, the thickness of the conductive thin film 21 is 0.1 μm or more. As a result, the conductive thin film 21 can have sufficient conductivity. Moreover, the thickness of the conductive thin film 21 is 1.5 μm or less from the viewpoint of thinning. The thickness of the conductive thin film 21 can be measured by taking 10 different cross-sectional SEM photographs of a range of 20 μm×20 μm and calculating an average value of the maximum thickness in each SEM photograph.

The plated layer 22 may have a single-layer structure or a multi-layer laminated structure. The plated layer 22 may have a structure in which, for example, a Cu-plated layer, a Ni-plated layer, and an Sn-plated layer are formed in this order.

In this embodiment, since the conductive thin film 21 is an intermittent film, the plated layer 22 is formed so as to fill the gaps where the conductive thin film 21 is not formed, and the anchor effect suppresses an interface peeling between the conductive thin film 21 and the plated layer 22. Thereby, the fixing strength to the substrate is improved. Further, when the conductive thin film 21 is an intermittent film, concentration of stress on a part of the conductive thin film 21 is suppressed. Thereby, peeling of the conductive thin film 21 from the multilayer chip 10 can be suppressed. Even if peeling occurs, the progress of peeling can be suppressed.

From the viewpoint of obtaining a sufficient anchor effect, the thickness of the conductive thin film 21 is preferably 0.2 μm or more, more preferably 0.5 μm or more. Also, the thickness of the conductive thin film 21 is preferably 1.0 μm or less, more preferably 0.7 μm or less.

If the continuity modulus of the conductive thin film 21 is low, the stress may not be necessarily sufficiently dispersed. Therefore, it is preferable to set a lower limit for the continuity modulus of the conductive thin film 21. For example, the continuity modulus of the conductive thin film 21 is preferably 30% or more, more preferably 40% or more, and even more preferably 50% or more.

Even if the conductive thin film 21 has a high continuity modulus, there is a possibility that the stress cannot be sufficiently dispersed. Therefore, it is preferable to set an upper limit for the continuity modulus of the conductive thin film 21. For example, the continuity modulus of the conductive thin film 21 is preferably 90% or less, more preferably 80% or less, and even more preferably 70% or less.

Figure 6:
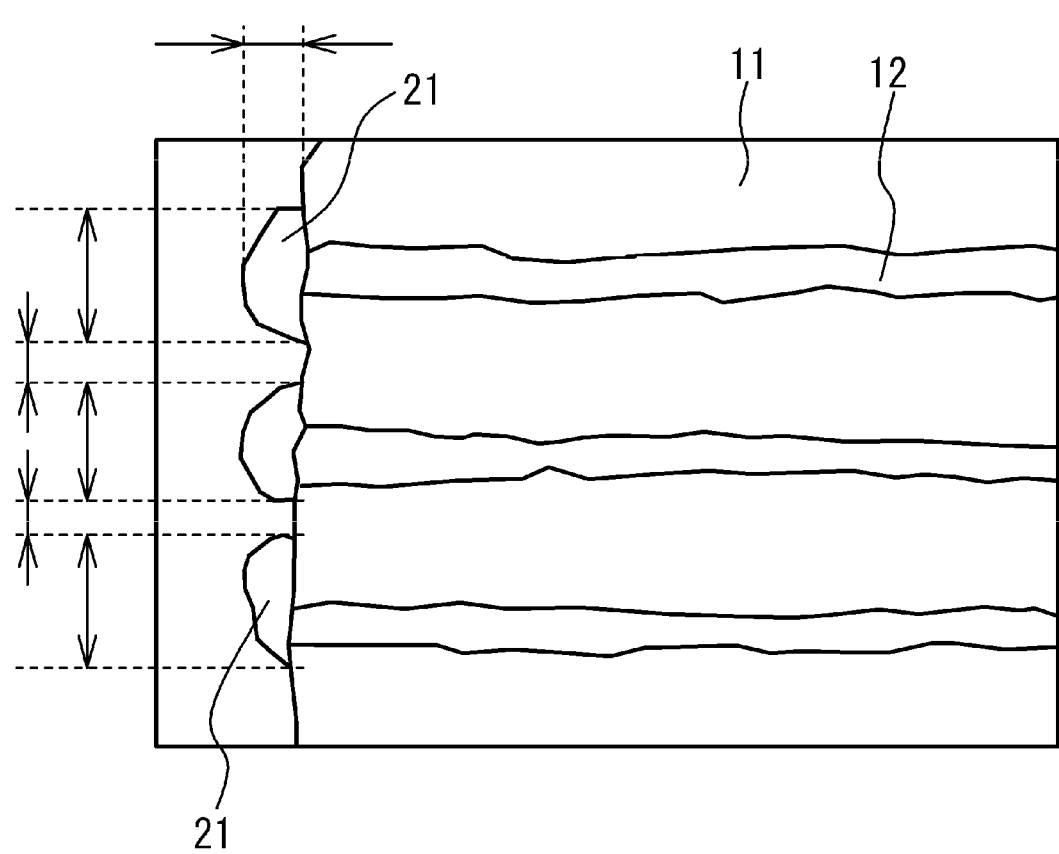
FIG. 6 illustrates a traced SEM image of a cross section in a stacking direction.

As illustrated in FIG. 6, the continuity modulus of the conductive thin film 21 is determined by measuring the length of the portion where the island-shaped portion exists and the length of the hole (interruption) exposing the multilayer chip 10 in the SEM photograph of the cross section in the stacking direction, and calculating the ratio of the total length of the island-shaped portions to the total measured length.

Further, as illustrated in FIG. 6, in the SEM photograph of the cross section of the conductive thin film 21 in the stacking direction, a hole with a width of 0.1 μm to 10.0 μm for exposing the multilayer chip 10 and an island-shaped portion having a height of 0.1 μm to 1.5 m may be formed alternately. By randomly forming the holes having a width of 0.1 μm to 10.0 m in this manner, stress concentration can be further reduced. For example, compared to the case where the conductive thin film is formed only on the exposed portions of the internal electrode layers 12 on the two end surfaces of the multilayer chip 10, stress can be dispersed.

The conductive thin film 21 has a continuity modulus of 30% or more and 90% or less in at least one of cross sections of the XZ plane at a plurality of different locations in the Y-axis direction, and holes having a width of 0.1 μm to 10.0 μm that exposes the multilayer chip 10 and peaks with a height of 0.1 μm to 1.5 μm may be alternately formed.

If the plated layer 22 is thin, it may not necessarily sufficiently cover the hole that exposes the multilayer chip 10. Therefore, it is preferable to set a lower limit for the thickness of the plated layer 22. For example, the thickness of the plated layer 22 is preferably 1 μm or more, more preferably 3 μm or more, and even more preferably 5 μm or more. The thickness of the plated layer 22 can be measured by taking 10 different cross-sectional SEM photographs of a range of 20 μm×20 μm and calculating an average value of the maximum thickness in each SEM photograph.

On the other hand, if the plated layer 22 is thick, not only is the thickness of the region that produces the capacitance sacrificed, but there is also the risk of peeling of the external electrodes due to film stress. Therefore, it is preferable to set an upper limit for the thickness of the plated layer 22. For example, the thickness of the plated layer 22 is preferably 15 μm or less, more preferably 12 μm or less, and even more preferably 10 μm or less.

Figure 7:
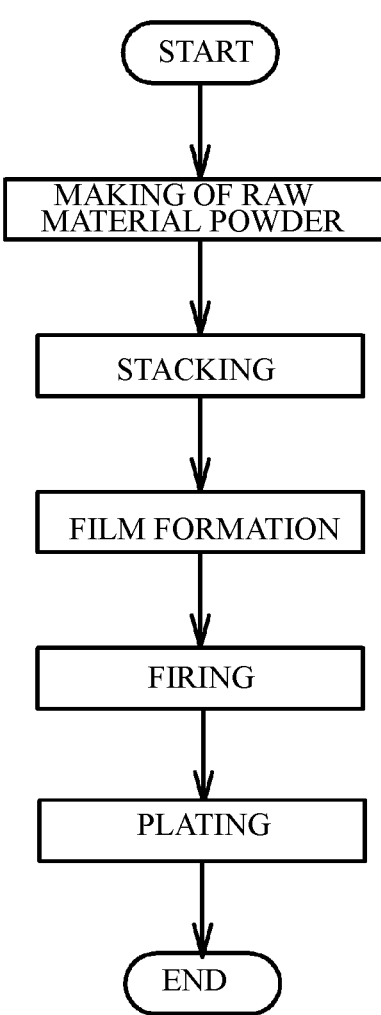
FIG. 7 is a flowchart of a manufacturing method of a multilayer ceramic capacitor of a first embodiment.

Next, a description will be given of a manufacturing method of the multilayer ceramic capacitors 100. FIG. 7 illustrates a manufacturing method of the multilayer ceramic capacitor 100.

(Making process of raw material powder) A dielectric material for forming the dielectric layer 11 is prepared. The dielectric material includes the main component ceramic of the dielectric layer 11. Generally, an A site element and a B site element are included in the dielectric layer 11 in a sintered phase of grains of $ABO_3$. For example, $BaTiO_3$ is tetragonal compound having a perovskite structure and has a high dielectric constant. Generally, $BaTiO_3$ is obtained by reacting a titanium material such as titanium dioxide with a barium material such as barium carbonate and synthesizing barium titanate. Various methods can be used as a synthesizing method of the ceramic structuring the dielectric layer 11. For example, a solid-phase method, a sol-gel method, a hydrothermal method or the like can be used. The embodiments may use any of these methods.

An additive compound may be added to the resulting ceramic powder, in accordance with purposes. The additive compound may be an oxide of Mg (magnesium), Mn (manganese), molybdenum (Mo), V (vanadium), Cr (chromium) or a rare earth element (Y (yttrium), Sm (samarium), Eu (europium), Gd (gadolinium), Tb (terbium), Dy (dysprosium), Ho (holmium), Er (erbium), Tm (thulium) and Yb (ytterbium)), or an oxide of Co (cobalt), Ni (nickel), Li (lithium), B (boron), Na (sodium), K (potassium) and Si (silicon). The additive compound may be a glass including cobalt, nickel, lithium, boron, sodium, potassium or silicon. Mainly, $SiO_2$ acts as a sintering assistant.

For example, the resulting ceramic raw material powder is wet-blended with additives and is dried and crushed. Thus, a ceramic material is obtained. For example, the grain diameter may be adjusted by crushing the resulting ceramic material as needed. Alternatively, the grain diameter of the resulting ceramic powder may be adjusted by combining the crushing and classifying. With the processes, a dielectric material is obtained.

(Stacking process) Next, a binder such as polyvinyl butyral (PVB) resin, an organic solvent such as ethanol or toluene, and a plasticizer are added to the resulting dielectric material and wet-blended. With use of the resulting slurry, a dielectric green sheet 52 is painted on a base material 51 by, for example, a die coater method or a doctor blade method, and then dried. The base material 51 is, for example, PET (polyethylene terephthalate) film.

Figure 8A:
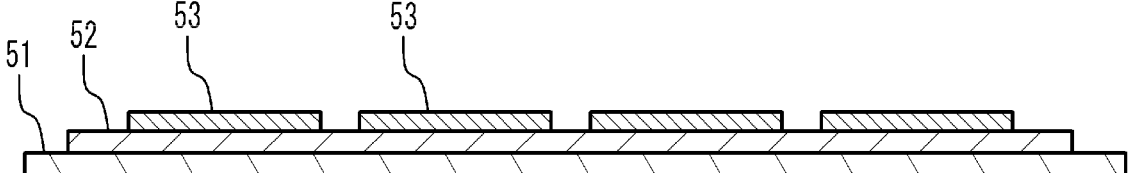
FIG. 8A and FIG. 8B illustrate a stacking process.

Next, as illustrated in FIG. 8A, an internal electrode pattern 53 is formed on the dielectric green sheet 52. In FIG. 8A, as an example, four parts of the internal electrode pattern 53 are formed on the dielectric green sheet 52 and are spaced from each other. The dielectric green sheet 52 on which the internal electrode pattern 53 is formed is a stack unit.

A metal paste of the main component metal of the internal electrode layer 12 is used for the internal electrode pattern 53. The film forming method may be printing, sputtering, vapor deposition or the like.

Figure 8B:
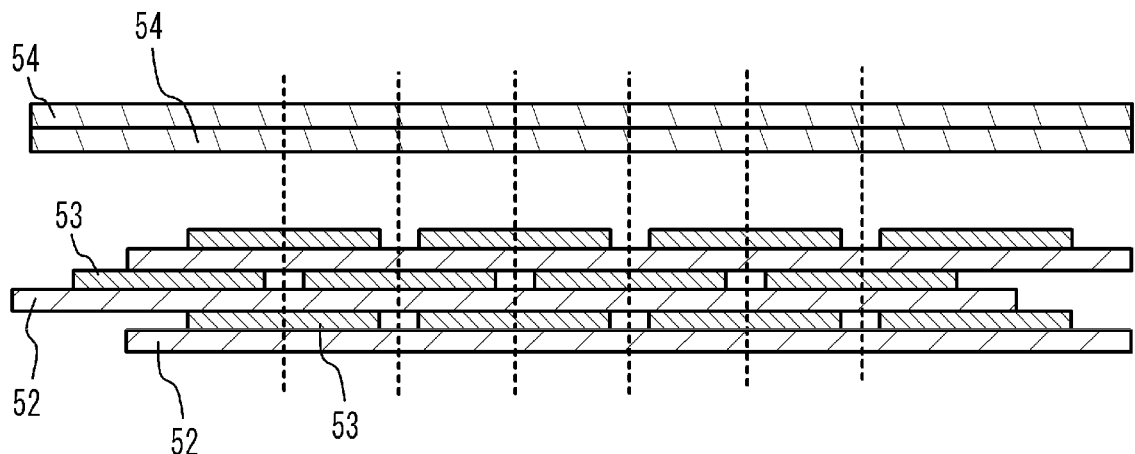

Next, the dielectric green sheets 52 are peeled from the base materials 51. As illustrated in FIG. 8B, the stack units are stacked.

A predetermined number of a cover sheet 54 is stacked on an upper face and a lower face of a ceramic multilayer structure of the stacked stack units and is thermally crimped. The resulting ceramic multilayer structure is cut into a chip having a predetermined size. In FIG. 8B, the multilayer structure is cut along a dotted line. Thus, a ceramic multilayer structure is obtained. By the cutting, the edges of the internal electrode patterns 53 are exposed to the two end faces of the ceramic multilayer structure. The components of the cover sheet 54 may be the same as those of the dielectric green sheet 52. Additives of the cover sheet 54 may be different from those of the dielectric green sheet 52.

Figure 9A:
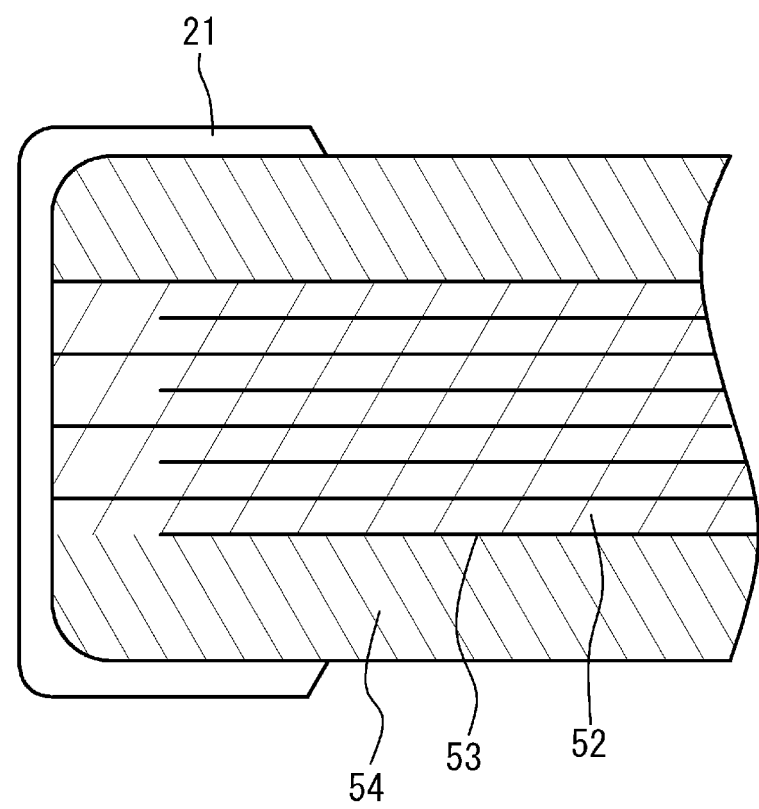
FIG. 9A illustrates a forming process.

(Film formation process) After chamfering the ceramic multilayer structure in this way, the binder is removed in an $N_2$ atmosphere at, for example, 250° C. to 400° C. As illustrated in FIG. 9A, the conductive thin film 21 is formed on the two end faces by sputtering. In FIG. 9A, hatching of the conductive thin film 21 is omitted. The conductive thin film 21 may be formed not only on the two end faces but also on the upper surface, the lower surface and the two side surfaces of the ceramic multilayer structure. At this point, the conductive thin film 21 may be a continuous film. A mask made of resin or metal is used to separate the conductive thin film 21 in the length direction (Y-axis direction) during film formation. In addition to sputtering, the method of film formation may be vacuum deposition, CVD (Chemical Vapor Deposition), ALD (Atomic Layer Deposition), or other vacuum film formation.

(Firing process) The resulting ceramic multilayer structure is fired for 10 minutes to 2 hours in a reductive atmosphere having an oxygen partial pressure of $10^{-5}$ to $10^{-8}$ atm in a temperature range of 1000 degrees C. to 1400 degrees C. In this manner, the multilayer chip 10 and the conductive thin film 21 can be formed by firing together with each other.

In this firing process, by softening the conductive thin film 21 and intentionally promoting its spheroidization, it is possible to obtain an intermittent film in which island-shaped portions are connected through holes. The coverage of the intermittent film can be controlled by changing the material, film thickness, film forming conditions, firing conditions, etc. of the conductive thin film 21. For example, in sputtering, the Ar partial pressure is set to 0.1 Pa to 10 Pa, and a direct current (DC) or alternating current (RF) of 0.1 kV to 7 kV is used to form the conductive thin film 21 that becomes intermittent during the firing process. When selectively forming the island-shaped portions of the conductive thin film 21 in the regions where the internal electrode layers 12 are exposed, the same kind of metals, their alloys, or metals which easily diffuse may be selected.

Figure 9B:
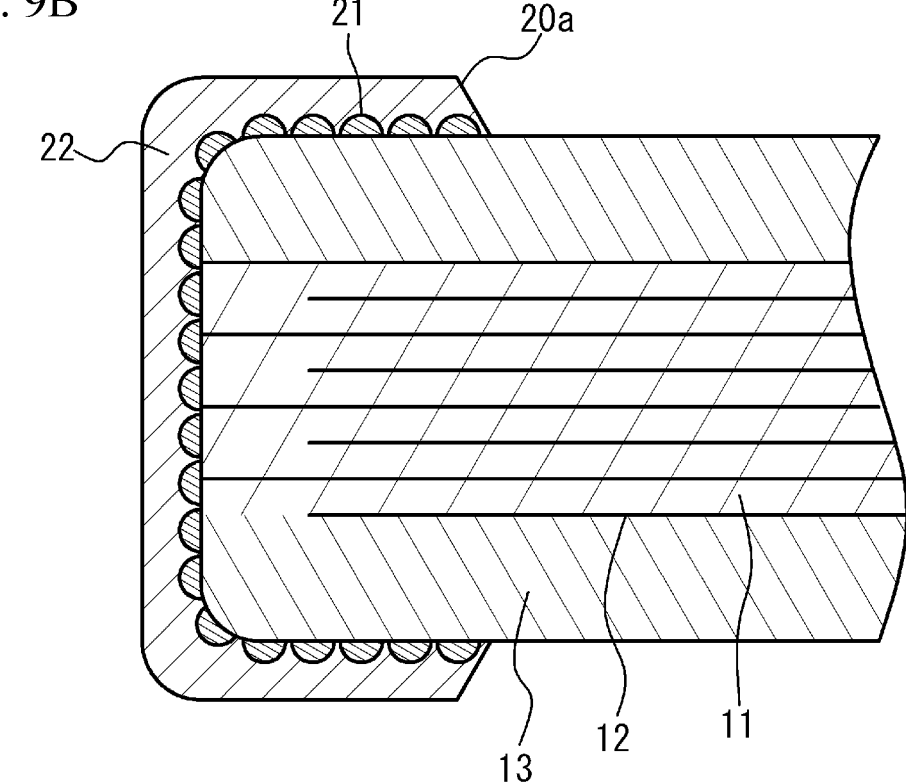
FIG. 9B illustrates a plating process.

(Plating process) After that, the plated layer 22 is formed on the conductive thin film 21 by plating, as illustrated in FIG. 9B. For example, a Cu-plated layer, a Ni-plated layer, and an Sn-plated layer may be formed in this order on the conductive thin film 21. For example, a 3 μm Cu-plated layer, a 2 μm Ni-plated layer, and a 5 μm Sn-plated layer may be formed in this order. By forming the plated layer 22 thicker than the conductive thin film 21, the influence of the intermittent film is less likely to remain on the plated layer 22, and the plated layer 22 can be a continuous layer.

According to the manufacturing method according to the present embodiment, the conductive thin film 21 formed by vacuum film formation is formed simultaneously with the multilayer chip 10 by the firing, so that the conductive thin film 21 can be made intermittent. As a result, the plated layer 22 is formed so as to fill the gaps where the conductive thin film 21 is not formed, so that the anchor effect can suppress peeling of the interface between the conductive thin film 21 and the plated layer 22. Furthermore, concentration of stress on a portion of the conductive thin film 21 is suppressed, and peeling of the conductive thin film 21 from the multilayer chip 10 can be suppressed. Even if peeling occurs, the progress of the peeling can be suppressed. By forming the multilayer chip 10 and the conductive thin film 21 at the same time in the firing, the conductive thin film 21 and the internal electrode layer 12 are integrated, and the adhesion of the conductive thin film 21 is improved.

Second Embodiment

Figure 10:
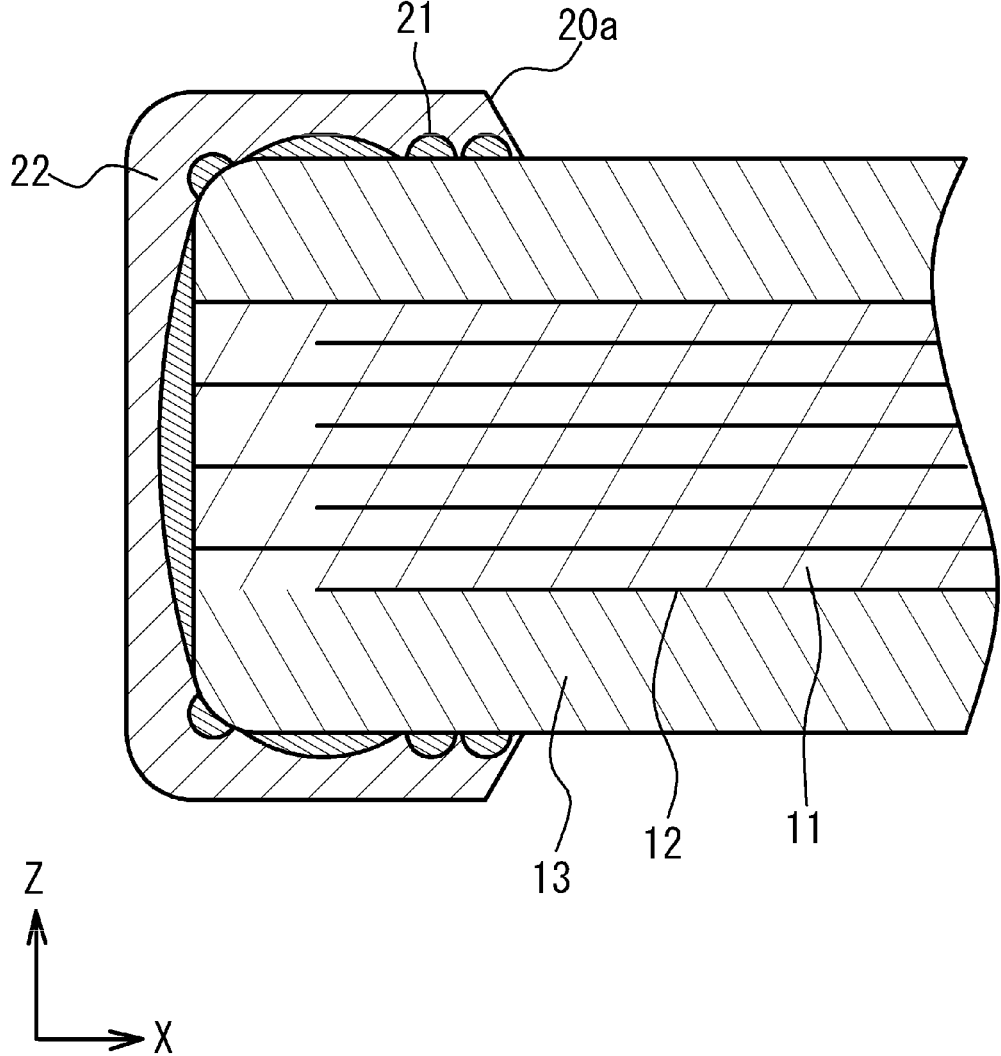
FIG. 10 illustrates a second embodiment.

The entire conductive thin film 21 does not have to be an intermittent film. For example, the conductive thin film 21 may have a structure in which a part of a continuous film is an intermittent film. For example, it is preferable that the conductive thin film 21 is intermittent at locations where stress concentration is likely to occur. For example, as illustrated in FIG. 10, the conductive thin film 21 is a continuous film in the regions where the internal electrode layers 12 are exposed on the two end surfaces of the multilayer chip 10, and the conductive thin film 21 is an intermittent film on the corner portions (edge portions) and the ends of the upper face, the lower face, and the two side faces.

Partial formation of the intermittent film is possible by partially changing the material and film thickness. For example, an intermittent film can be partially formed by forming an opening in a region desired to be a continuous film and providing a mask in a region desired to be an intermittent film.

Third Embodiment

Figure 11:
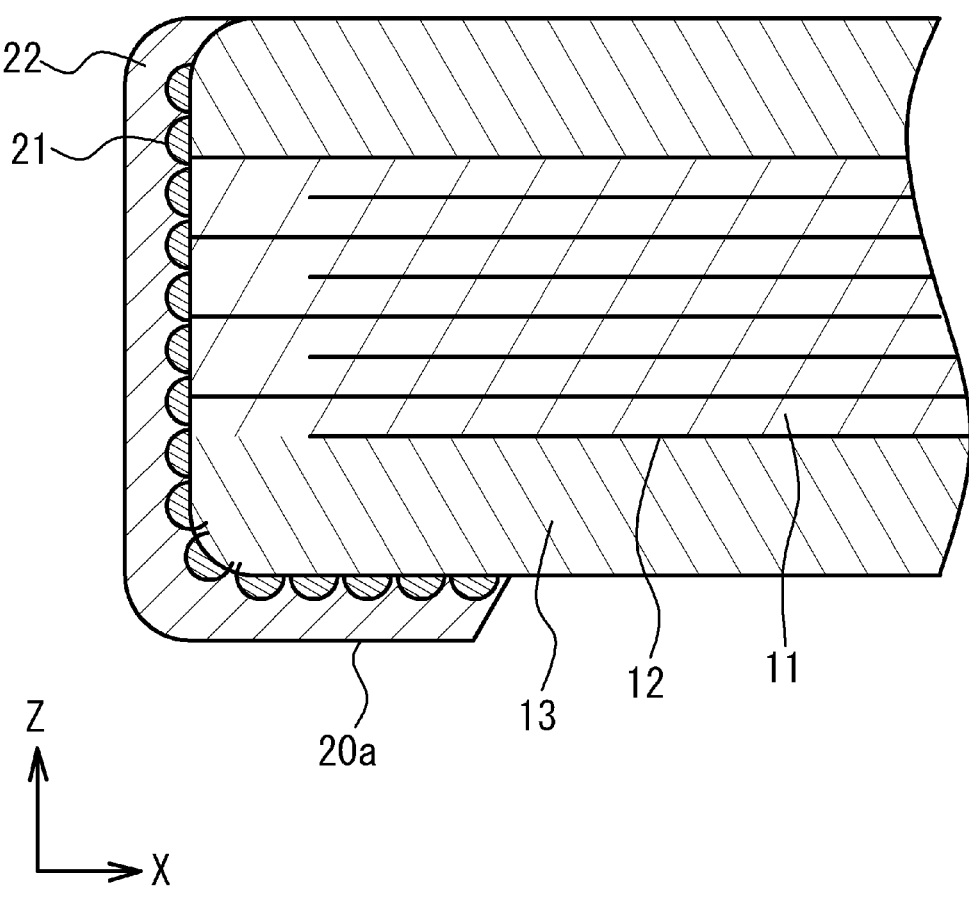
FIG. 11 illustrates a third embodiment.

From the viewpoint of thinning the multilayer ceramic capacitor 100, the formation of the external electrodes on either the upper face or the lower face of the multilayer chip 10 may be omitted. For example, as illustrated in FIG. 11, the formation of the plated layer 22 may be omitted without forming the conductive thin film 21 on the upper face of the multilayer chip 10. With this configuration, the multilayer ceramic capacitor 100 can be made thinner.

In the embodiments, the multilayer ceramic capacitor is described as an example of ceramic electronic devices. However, the embodiments are not limited to the multilayer ceramic capacitor. For example, the embodiments may be applied to another electronic device such as varistor or thermistor.

Examples (Example) A multilayer ceramic capacitor was manufactured by the manufacturing method according to the above embodiment. A conductive thin film was formed by sputtering on two end faces of a ceramic multilayer structure in which stack units each having an internal electrode pattern printed on a ceramic green sheet were stacked. The sputtering conditions were a DC output of 1 kW, a film forming pressure of 0.7 Pa, and a film thickness of 500 nm using a Ni-based target. After that, the ceramic multilayer structure and the conductive thin film were formed by firing at the same time to make the conductive thin film intermittent. After that, a plated layer was formed using the conductive thin film as a seed layer.

(Comparative example) In the comparative example, the sputtering film thickness was set to 1000 nm. Other conditions were the same as in the example. The conductive thin film remained a continuous film without discontinuities.

Figures 12A, 12B:
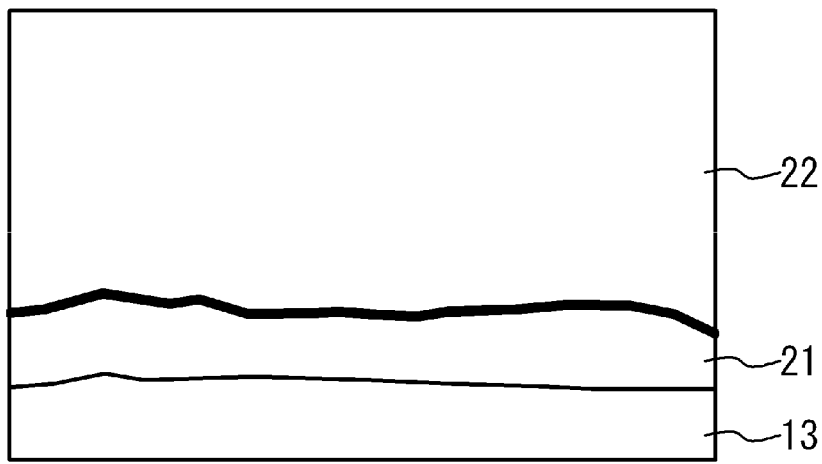
FIG. 12A is a diagram obtained by tracing a SEM photograph of a cross section near a conductive thin film of a comparative example.
FIG. 12B is a diagram obtained by tracing a SEM photograph of a cross section near a conductive thin film of an example.

FIG. 12A is a diagram obtained by tracing a SEM photograph of a cross section near the conductive thin film of the comparative example. As illustrated in FIG. 12A, it can be seen that the conductive thin film 21 was a continuous film. The plated layer 22 was formed on the conductive thin film 21. It can be seen that a gap (blackened portion) was formed between the conductive thin film 21 and the plated layer 22. FIG. 12B is a diagram obtained by tracing a SEM photograph of a cross section near the conductive thin film of the example. As illustrated in FIG. 12B, it can be seen that the conductive thin film 21 was an intermittent film. The plated layer 22 was formed on the conductive thin film 21. It can be seen that the plated layer 22 entered the discontinuous portions of the conductive thin film 21, and high adhesion could be obtained by the anchor effect.

Although the embodiments of the present invention have been described in detail, it is to be understood that the various change, substitutions, and alterations could be made hereto without departing from the spirit and scope of the invention.

What is claimed is:

1. A ceramic electronic device comprising:
a multilayer chip in which each of a plurality of dielectric layers and each of a plurality of internal electrode layers are alternately stacked in a first direction, the multilayer chip having a parallelepiped rectangular shape, the plurality of internal electrode layers being alternately exposed to two opposite faces of the multilayer chip; and
two external electrodes that are formed respectively on the two opposite faces,
wherein the two external electrodes have a structure in which a plated layer is formed on a conductive thin film intermittently formed with a thickness of 0.1 μm or more and 1.5 μm or less, the conductive thin film being formed of a material that is different from a material of the internal electrodes so as to be distinct and separate from the internal electrodes, and
wherein the conductive thin film has a plurality of portions each covering an end of one of the plurality of internal electrode layers that is exposed to a corresponding one of the two opposite faces in a cross section taken along a plane orthogonal to the corresponding one of the two opposite faces and parallel to the first direction, each of said portions spanning ends of two adjacent dielectric layers that sandwich a corresponding one of the plurality of internal electrode layers and at least partially covering the respective ends of said two adjacent dielectric layers at the corresponding one of the two opposite faces in said cross section, and
wherein a continuity modulus of the conductive thin film is 30% or more and 90% or less.

2. The ceramic electronic device as claimed in claim 1, wherein, in at least a part of the conductive thin film, each of holes with a width of 0.1 μm or more and 10.0 μm or less for exposing the multilayer chip and each of island-shaped portions with a height of 0.1 μm or more and 1.5 μm or less are alternately formed.

3. The ceramic electronic device as claimed in claim 1, wherein, in at least a part of the conductive thin film, a discontinuous island-shaped portion is formed.

4. The ceramic electronic device as claimed in claim 1, wherein in a cross section of the plurality of internal electrode layers and the plurality of dielectric layers in a stacking direction, in a region where the plurality of internal electrode layers are exposed, the conductive thin film includes an island-shaped portion connected to at least one of the plurality of internal electrode layers and an island-shaped portion not connected to any of the plurality of internal electrode layers.

5. The ceramic electronic device as claimed in claim 1, wherein the conductive thin film is continuous in a region where the plurality of internal electrode layers are exposed on the two end faces.

6. The ceramic electronic device as claimed in claim 1, wherein the external electrodes are not formed on one of an upper face and a lower face of the multilayer chip in a stacking direction of the plurality of internal electrode layers and the plurality of dielectric layers.

7. The ceramic electronic device as claimed in claim 1, wherein a thickness of the plated layer is 1 µm or more and 15 µm or less.

8. The ceramic electronic device as claimed in claim 1, wherein the plated layer has a structure in which a Cu-plated layer, a Ni-plated layer and a Sn-plated layer are formed in this order from the conductive thin film.

9. The ceramic electronic device as claimed in claim 1, wherein the plated layer is thicker than the conductive thin film.

10. The ceramic electronic device as claimed in claim 1, wherein the ceramic electronic device is a multilayer ceramic capacitor.

11. The ceramic electronic device as claimed in claim 1, wherein the continuity modulus of the conductive thin film is 40% or more and 80% or less.

12. The ceramic electronic device as claimed in claim 1, wherein the continuity modulus of the conductive thin film is 50% or more and 70% or less.

\*    \*    \*    \*    \*